(12) United States Patent
Nybom

(10) Patent No.: US 10,438,194 B2
(45) Date of Patent: Oct. 8, 2019

(54) METHODS AND APPARATUS FOR STORED VALUE TOKEN CREATION

(75) Inventor: Kaj Svante Nybom, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 858 days.

(21) Appl. No.: 12/606,430

(22) Filed: Oct. 27, 2009

(65) Prior Publication Data

US 2011/0099104 A1  Apr. 28, 2011

(51) Int. Cl.
  G06Q 20/34  (2012.01)
  G06Q 20/06  (2012.01)
  G06Q 20/10  (2012.01)
  G06Q 20/38  (2012.01)
  G06Q 20/40  (2012.01)

(52) U.S. Cl.
  CPC .......... *G06Q 20/355* (2013.01); *G06Q 20/06* (2013.01); *G06Q 20/0655* (2013.01); *G06Q 20/105* (2013.01); *G06Q 20/1085* (2013.01); *G06Q 20/387* (2013.01); *G06Q 20/405* (2013.01)

(58) Field of Classification Search
  CPC ............................. G06Q 40/00; G06Q 20/355
  USPC .................................. 705/1–50, 76; 726/1–10
  See application file for complete search history.

(56) References Cited

U.S. PATENT DOCUMENTS

| | | | | |
|---|---|---|---|---|
| 7,225,264 B2* | 5/2007 | Croman et al. | ............... | 709/232 |
| 7,287,692 B1* | 10/2007 | Patel et al. | ..................... | 235/380 |
| 7,290,705 B1* | 11/2007 | Shin | ....................... | G06Q 20/18 235/379 |
| 7,523,859 B2* | 4/2009 | Patel et al. | ..................... | 235/380 |
| 7,797,204 B2* | 9/2010 | Balent | .................. | G06Q 10/087 705/26.8 |
| 8,046,266 B1* | 10/2011 | Geller | .................... | G06Q 30/02 705/14.1 |
| 2002/0007351 A1* | 1/2002 | Hillegass et al. | ............... | 705/59 |
| 2003/0220876 A1* | 11/2003 | Burger et al. | ................... | 705/50 |
| 2007/0215699 A1* | 9/2007 | Arego et al. | .................. | 235/380 |
| 2008/0011823 A1* | 1/2008 | Patel et al. | ..................... | 235/375 |
| 2008/0103627 A1* | 5/2008 | Torian | ............... | G06Q 20/3558 700/233 |
| 2008/0208747 A1* | 8/2008 | Papismedov | .......... | G06Q 20/20 705/44 |

(Continued)

OTHER PUBLICATIONS

"Radiant Systems", Film Journal international 111.4: 122(1), The Nielsen Company, Apr. 2008. (Year: 2008).*

*Primary Examiner* — Eric T Wong
(74) *Attorney, Agent, or Firm* — Schwegman, Lundberg & Woessner

(57) ABSTRACT

Systems and techniques for managing creation, delivery, and redemption of stored value tokens such as gift cards and electronic gift cards. An interface presented to a donor at a terminal allows the donor to specify details of a token, including token value and whether the token is to be associated with a particular retailer or group of retailers. The donor is also able to specify restrictions on the use of the token. For example, the donor may prohibit the purchase of particular categories of products or may specify categories of products authorized for purchase and the amount that may be spent for each category. The donor is also able to specify particular products to be purchased. A token definition is stored and a token associated with the definition is delivered to a recipient. When the recipient presents the token for redemption, the token is redeemed according to the definition.

7 Claims, 11 Drawing Sheets

(56) References Cited

U.S. PATENT DOCUMENTS

| | | | | |
|---|---|---|---|---|
| 2009/0259553 A1* | 10/2009 | Carroll | G06Q 20/20 | 705/15 |
| 2010/0010918 A1* | 1/2010 | Hunt | G06Q 20/102 | 705/26.1 |
| 2010/0038419 A1* | 2/2010 | Blake et al. | | 235/379 |
| 2010/0065629 A1* | 3/2010 | Wentker | G06Q 20/40 | 235/382 |
| 2010/0235286 A1* | 9/2010 | Moore | | 705/76 |
| 2011/0106698 A1* | 5/2011 | Isaacson | G06Q 20/105 | 705/41 |
| 2012/0066093 A1* | 3/2012 | Carpenter | G06Q 30/06 | 705/26.61 |
| 2013/0284805 A1* | 10/2013 | Kraft | G07F 11/62 | 235/381 |
| 2014/0040059 A1* | 2/2014 | Barabas | G06Q 30/0601 | 705/26.1 |
| 2014/0207659 A1* | 7/2014 | Erez | G06O 30/0633 | 705/39 |

\* cited by examiner

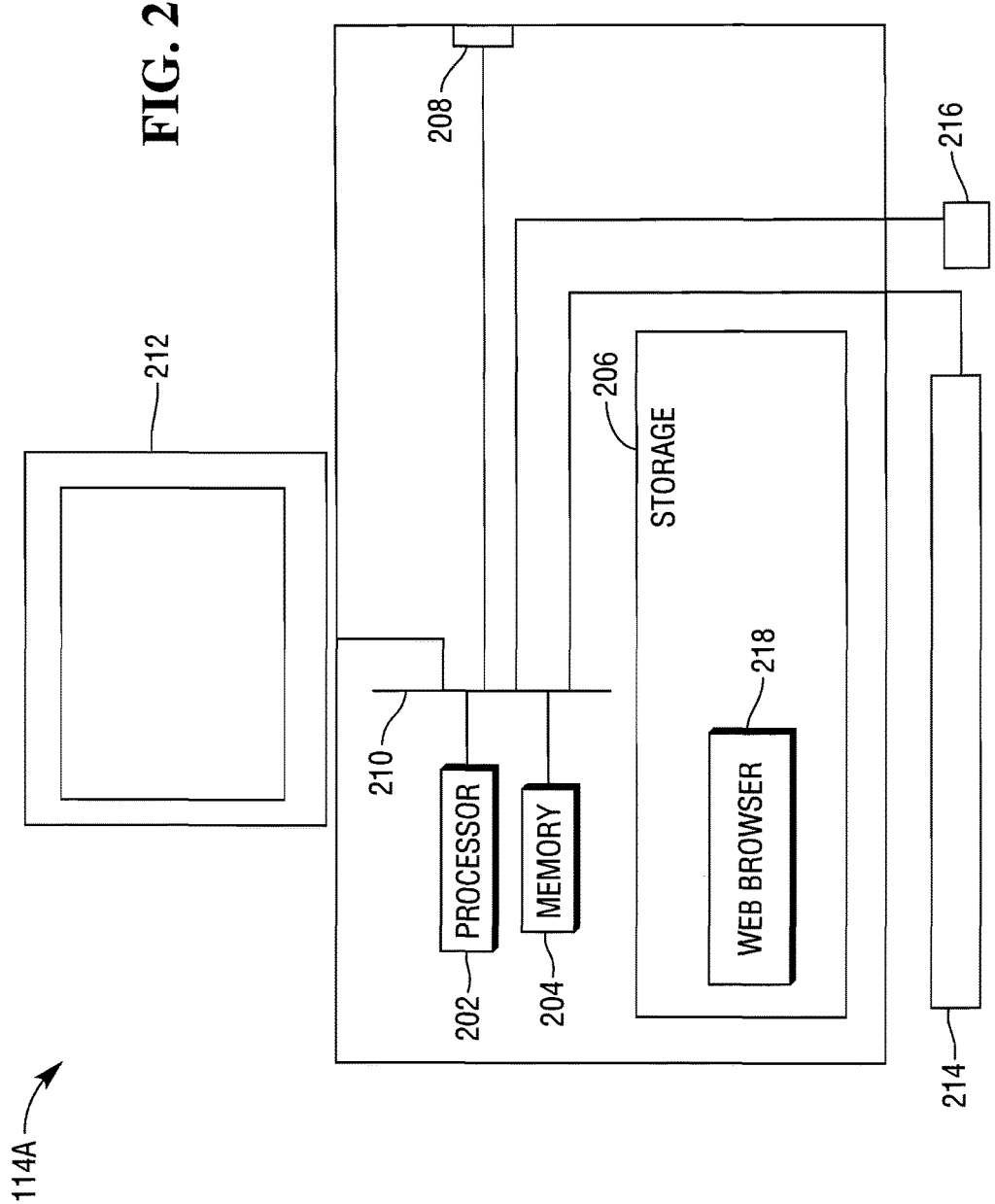

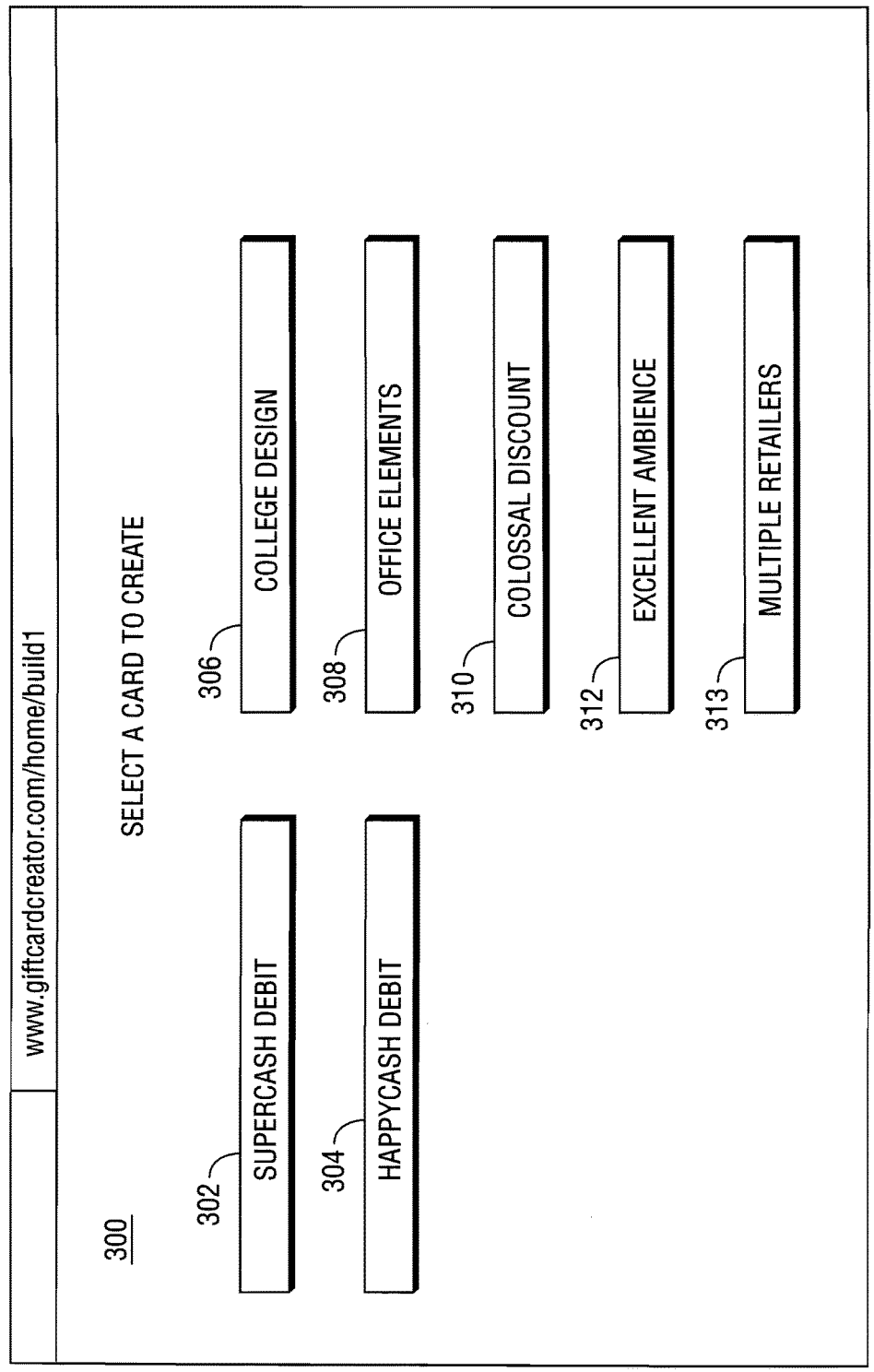

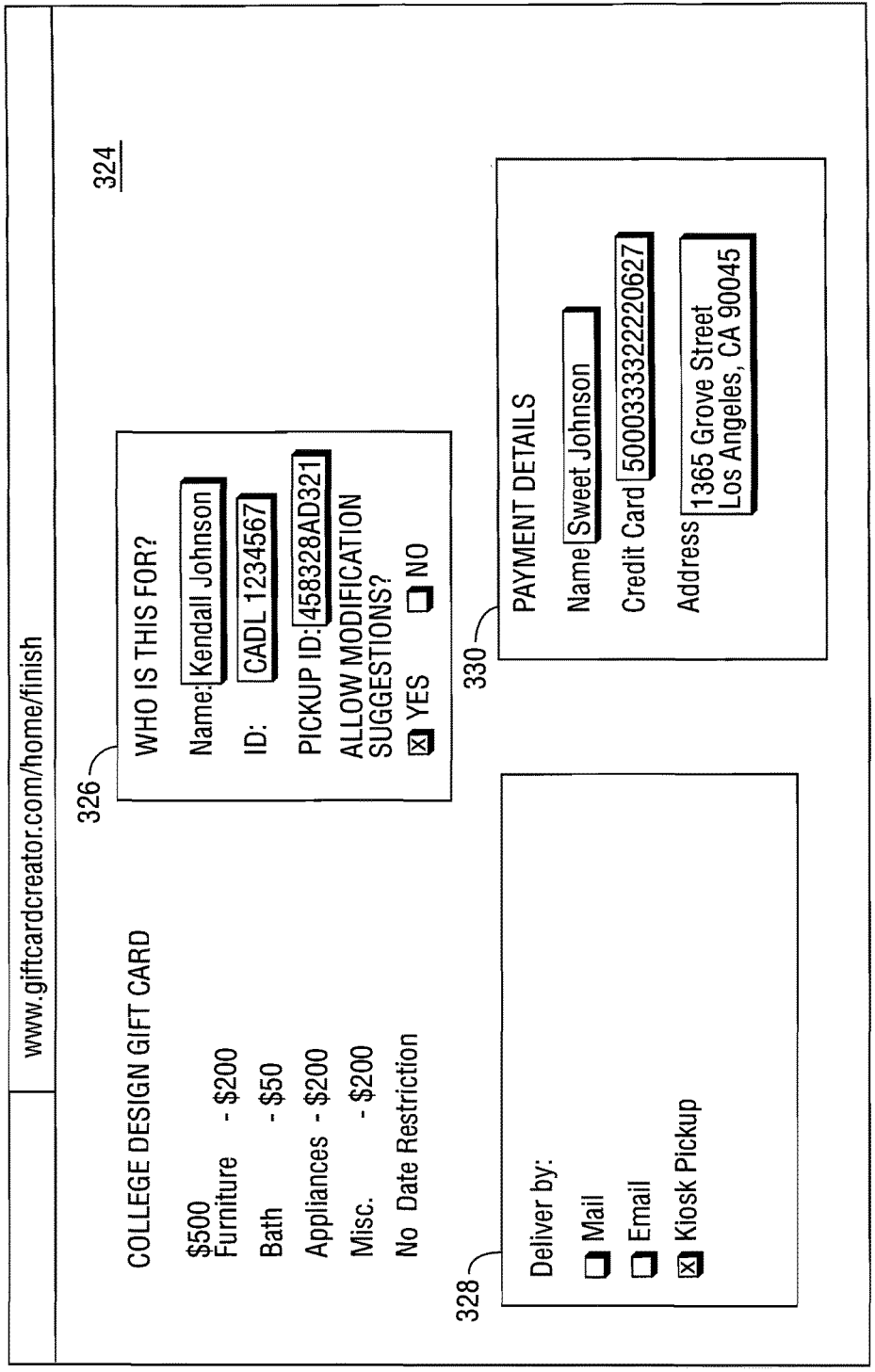

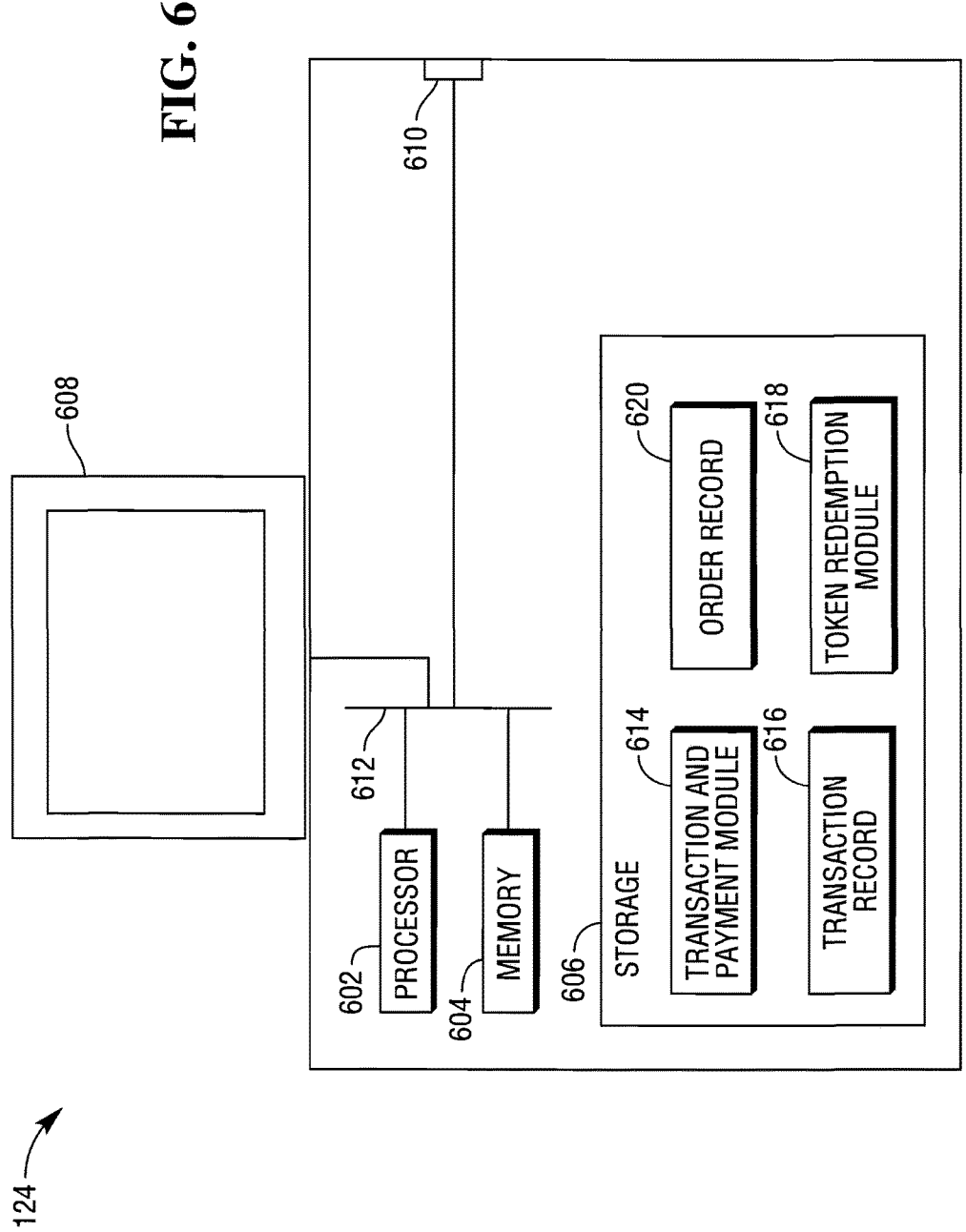

METHODS AND APPARATUS FOR STORED VALUE TOKEN CREATION

FIELD OF THE INVENTION

The present invention relates generally to improved systems and techniques for delivering stored value tokens. More particularly, the invention relates to systems and techniques for individualized creation of stored value tokens such as gift cards and electronic gift cards, allowing for restrictions on the types of merchandise that may be purchased with the token.

BACKGROUND OF THE INVENTION

Stored value tokens, such as gift certificates and gift cards, have long been popular, providing gift givers with an opportunity to provide a gift that allows flexibility to the recipient, but is less impersonal than the giving of cash. Stored value tokens have also been useful for parents providing support for their children, such as children who are away at college, allowing them to provide certain restrictions on spending. For example, a gift card may be purchased in a prescribed amount, and cards such as a store credit card limit purchases to the issuing store or store chain.

SUMMARY OF THE INVENTION

The present invention recognizes that the current widespread availability and power of data processing and data communication equipment allows for the creation of systems and techniques for the custom design of stored value tokens. One aspect of the present invention therefore allows a user to create a token designating with more or less specificity the items that can be purchased. For example, a prepaid debit card can be created, allowing purchases from all merchants accepting the card, but with restrictions on the types of merchandise that can be purchased, such as alcohol. To take another example, a gift card can be created that designates an entire selection of purchases, or allows for selections from a limited range of each of a number of items. Such a card might, for example, designate elements of a meal, specifying each course of the meal or specifying that each course of the meal might be taken from one of a limited number of choices. To take another example, a card can be created that allows for purchase of a variety of items, with a price limitation for each item. Such a card might, for example, be given to a college student by a parent to allow purchases for furnishing a room, and allows the parent to insure that the value cannot be entirely depleted by use for the purchase of one big ticket item, such as a sound system or big screen television, for example.

A system according to one aspect of the present invention therefore provides for a system for creation and use of stored value tokens. A server communicates with a plurality of terminals allowing users at each terminal to create tokens having the desired properties. An identifier is associated with properties for each token, and created tokens may be stored in a database, with the database storing a record for each token. Each record includes an identifier for the token, as well as properties associated with the identifier. A token may be associated with a donor identifier or a recipient identifier, allowing a donor or recipient to create the token and collect it at a station such as a kiosk. Each token provides access to its associated record, which may be stored on the token, for example, if the token is a smart card, or may be accessible using a token identifier. When the token is used for purchases, the token's associated record is consulted and used to restrict the purchases. Whenever a token is used for purchases, the token record is updated to reflect the effects of the purchases, such as partial or total depletion of value, depletion of value to be used for a particular item or purpose, or other effects on the token's remaining value and allowed uses of that value.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates details of a user terminal according to an aspect of the present invention;

FIGS. 3A-3C illustrate exemplary display screens presented by a user terminal according to an aspect of the present invention;

FIG. 6 illustrates details of a point of sale terminal according to an aspect of the present invention.

DETAILED DESCRIPTION

Figure 1:
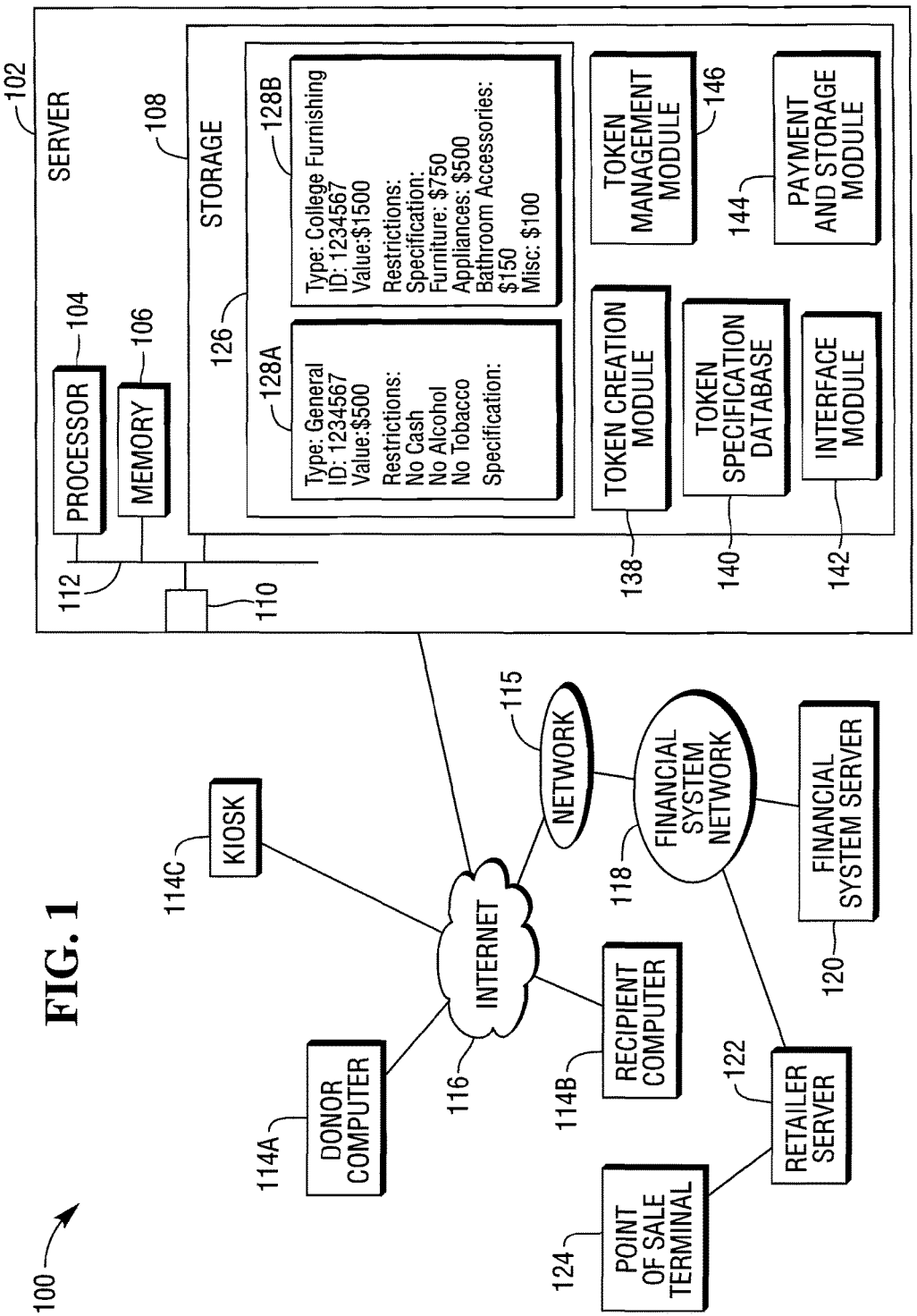
FIG. 1 illustrates a system allowing for stored value token creation and use according to an aspect of the present invention.

FIG. 1 illustrates a stored value creation, delivery, and redemption system 100 according to an aspect of the present invention. The system 100 includes a server 102, including a processor 104, memory 106, and storage 108, and network interface 110, communicating over a bus 112. The server 102 communicates with a plurality of terminals, including a donor computer 114A, a recipient computer 114B, and a token creation and delivery kiosk 114C, over a network 115. Three exemplary terminals 114A-114C are illustrated here, but it will be recognized that the system 100 may support a large number of terminals of a wide variety, with many terminals, such as the donor computer 114A and the recipient computer 114B being general purpose computers establishing a temporary connection to the system 100 for the purpose of managing token creation. The network 115 provides access to the public Internet 116 and to a secure financial system network 118. The financial system network 118 provides access to one or more financial center servers such as the financial server 120, and also provides access to retailer servers, such as the server 122. The server 122 serves a plurality of retailer terminals, such as a point of sale terminal 124, with the point of sale (POS) terminal 124 also being able to communicate with the financial server 120 through the retailer server 122.

A stored value token created by the system 100 comprises a record defining the value of the token and the acceptable uses of the token. The server 102 therefore stores a token record repository 126, with exemplary token records 128A and 128B residing in the repository 126. A token record includes information identifying the token type, an identifier code, value information, restrictions, and purchase specification information. The token type identifies whether the token as a general financial instrument usable anywhere that a typical credit card or debit card might be employed or whether it is associated with a specific retailer or a group of retailers. A token type designating a group of retailers may specify a predetermined group, such as the retailers in a mall, a group of related restaurants, or a similar predetermined group, or may be specifically defined by the donor, allowing the donor to specify each member of a group of retailers where the token may be used. Specifically designating a plurality of retailers provides flexibility for the recipient and control for the donor, and such a combination of flexibility and control is particularly useful in cases in which the donor is a parent and the recipient is a college student.

Restrictions may include prohibition of or restrictions on cash withdrawal, and designation of goods that may not be purchased, such as alcohol or tobacco, may be specified. Alternatively or in addition, designations of allowed purchases may be specified. For example, a specific list of goods to be purchased may be designated, or categories of items allowed for purchase may be designated, with or without monetary limits on categories of items or specific items.

In the present exemplary case, the token record 126A defines the token as a general financial instrument, includes the identifier 1234567, and indicates a value of $500. Cash withdrawal is prohibited, as is the purchase of alcohol or tobacco. The token record 126B is valid at the College Furnishing chain, includes the identifier 1245812, and has a value of $1500. The token contains no general restrictions, that is, no prohibited categories. Instead, the token specifies a number of categories of goods that may be purchased and limits on the amount that can be spent on each category. In the present example, the categories are furniture with a limit of $750, appliances with a limit of $500, bathroom accessories with a limit of $150, and miscellaneous, with a limit of $100.

The server 102 implements a token creation module 138, which manages communication with terminals such as the terminals 104A-104C to allow for creation of tokens. The token creation module 138 may suitably be implemented as software residing in storage 108, and transferred to memory 106 as needed for execution by the processor 104. The token creation module 138 has access to token specification database 140, which stores designations of the various specifications that may be used in the creation of tokens, such as allowable types of tokens, financial networks in which various types of tokens may be used, retailers for which tokens may be created, authentication conditions for tokens to be used on various financial networks and at various retailers, restriction categories, purchase specification categories, and other parameters and specifications that may define a token. The token creation module 138 may also provide for communication with a server such as the retailer server 122 in order to have access to the product inventory of the retailer in order to designate specific products or categories of products that it may be desired to specify. Such communication may be particularly useful in designing a token for use in a restaurant, where the donor wishes to specify elements of a meal.

The token creation module 138 invokes an interface module 142, which presents user interfaces to terminals such as the terminals 114A-114C that are used to create tokens. The interface module 142 presents selection menus and receives user selections and inputs, drawing from the database 140 and servers such as the server 122 to create further menus relevant to the initial selections. For example, the token interface module 142 may initially present selections allowing a user to select a token from a financial network or from one of a selection of retailers. Based on that initial choice, further relevant choices will be presented, such as menus allowing selections and entries for restrictions on the types of merchandise that may be purchased, specification of merchandise categories, specification of items to be purchased, and so on. For example, if a token is selected for a home furnishing store, a menu may be presented allowing the user to specify various categories of home furnishings offered by the store as being eligible for purchase, while if a token is selected for a financial network token, selections may be presented allowing for prohibitions or limitations on various types of merchandise, as well as a selection to allow or prohibit the withdrawal of cash, as well as limitations on the amount of cash that may be withdrawn in a specified period. Additional specifications may include a restriction on the time period during which the token can be used without further authorization from the donor. The donor may specify a valid date range during which the token can be used. For example, the donor may specify that the token becomes valid on a particular date, such as the recipient's birthday, and does not become invalid. In another example, the donor may specify that the token is valid during a holiday sale period, such as December 26 through January 1. In a further example, the donor may specify that the token is valid during a school semester, and may further include restrictions on the amount that can be spent during a particular time period, such as per week or per month.

Additional restrictions may be associated with the time of day or the time of the week. For example, during the period between midnight and 5 AM, the token may become invalid for purchase other than taxi fares and transit purchases. As another example, the amount that may be spent on a weekend day may be reduced.

Once the various user selections and entries have been made and the user has indicated that the token is satisfactory, the token creation module 138 invokes a payment and storage module 144. The payment and storage module 144 manages entry and authorization of payment details and final validation of the token. Once payment has been accepted, a token record is created and stored in the repository 126. From the repository 126, the token record may be transferred as needed, for example, to a financial system server such as the server 120 or to a redemption server such as the server 122.

The server 102 further implements a token management module 146. The token management module 146 provides for appropriate delivery of token information, and updating of token information while the token remains in the system 100. Depending on the particular mechanisms desired for redemption, a token record may be transferred to a server maintained by or for the entity responsible for redemption of the token, and deleted from the repository 126 once such a transfer has been accomplished, or the token record may be maintained in the repository 126 and updated as information relating to redemption of the token is received. If specified by the donor, redemption information may be relayed to the donor as transactions are conducted.

Once a token has been created, the token management module 146 manages the delivery of the token to a recipient. Such delivery may be accomplished by any of a number of mechanisms. For example, a physical medium, such as a magnetic stripe card or smart card may be encoded with an identifier and delivered to a donor for physical delivery to a recipient. A card so delivered may be encoded with additional information. For example, particularly in the case of a smart card, the entire record for the token may be stored on the card. Delivery may be accomplished in this manner, for example, if a donor or recipient is present at a terminal equipped to produce and deliver physical media, such as the kiosk 114C.

If a donor creates a token at a kiosk such as the kiosk 114C, the token management module 146 notifies the terminal when payment is accepted and creation accomplished, and the terminal presents a message to the donor asking if the donor wishes to receive the token immediately. If the donor answers in the affirmative, a medium such as a gift card is created and an identifier and other appropriate information are stored on the medium. The medium is then delivered to the donor, who may then deliver the medium in any manner desired.

Numerous additional mechanisms for delivery exist. For example, if a donor does not wish to receive a physical medium personally, but wishes it to be issued to a recipient at a later time or at another location, the donor may receive an authenticator to be delivered to the recipient, or may choose to submit identifying information for the recipient. When the recipient appears at the kiosk 114C or another suitably equipped terminal, such as an automated teller machine (ATM) modified to implement the present invention, the recipient is able to provide the required identification and receive the medium. If desired, a kiosk 114C or other terminal may be operative to store a token record on a recipient's existing medium, such as a gift card or identification card, upon submission by the recipient.

To take another alternative, a donor might create a token by using the donor terminal 114A to communicate with the server 102. Once the token has been created, an authenticator may be delivered to the recipient, or identifying information for the recipient may be provided, allowing the recipient to receive a physical medium at a terminal such as the kiosk 114C.

Another suitable delivery mechanism is through the delivery of information to the recipient, for example, at a recipient terminal 114B. An electronic certificate can be emailed to the recipient, with the certificate including identifying codes and other authentication mechanisms. The user can print a copy of the electronic certificate for use in a physical retail location, or can use it for electronic redemption, such as for online purchases. A printed copy of the certificate may suitably include a bar code including an identifier allowing for convenient access to an associated record, and if desired, may include a two dimensional bar code. Such a bar code may include both an identifier and details of the specifications included in the record, such as value, purchase restrictions, and the like. As the certificate is used, the record associated with the certificate is updated, and if desired, the printing of successive copies of the electronic certificate may be allowed, with each certificate providing access to the record. The identifier provided with a printed certificate may suitably expire after a specified time, or may be invalidated by the recipient as desired, requiring the printing of a new certificate. Such a mechanism allows for security in the event of loss of a paper copy, and for easy and secure replacement if a paper copy becomes worn or damaged.

Another delivery mechanism involving the use of a recipient terminal 114B or similar terminal involves the use of the terminal 114B to communicate with the server 102. A recipient employs the terminal 114B to present identifying information to the token management module 146, and the token management module 146 delivers certificate information which can be printed at the terminal 114B, or stored at the terminal 114B for later printing. A terminal such as the terminal 114C may also be used to print a paper certificate if desired.

Once a token has been created and delivered, the associated token record is updated to indicate that the token is valid. In addition, an appropriate transfer of value is made to a financial network, a retailer, or another entity. Such financial transfers may be accomplished at any interval desired. For example, appropriate financial transfers may be made after each creation of a token, or may be made periodically for an aggregate amount representing the tokens created in a given time interval.

The token record is then transferred to a server that manages token redemption. For example, the token record 128A may be transferred to the financial network server 120 and the token record 128B may be transferred to the retail server 122. The financial network server 120 and the retail server 122 then manage redemption requests as they are presented, consulting and updating the record associated with a token each time the token is presented for redemption. As an alternative, redemption requests may be communicated to the server 102, with the token maintenance module 146 managing financial transfers responsive to the redemption requests and updating token records of tokens presented for redemption.

Once the token, or token information, has been delivered to a recipient, the recipient may be provided the opportunity to communicate alternative suggestions to the donor, who may then be able to reject or approve the suggestions, or to make other modifications. Delivery of a token to a recipient may involve presentation of the token details in an interface, with the recipient being asked if he or she would like to suggest modifications. If the recipient answers in the affirmative, the token management module 146 communicates an alert to the donor, presenting the donor with an interface form showing the modifications suggested by the recipient. The modifications may involve the overall amount, changes to authorized categories, changes to amount allowed for each category, changes to specific designations of products, changes to the specified retailer, or any alternative or additional changes that the recipient may wish to suggest. If desired, the donor may also specify that the token cannot be modified, in which case the recipient is not able to suggest changes.

FIG. 2 illustrates additional details of a donor computer 114A. The donor computer 114A comprises a processor 202, memory 204, storage 206, and network interface 208, communicating over a bus 210. The donor computer 114A further comprises a monitor 212, keyboard 214, and mouse 216. The donor computer 114A communicates with the server 102 over the public Internet 108, using a web browser 218, which is implemented as software residing in storage 206 and transferred to memory 204 as needed for execution by the processor 202. The token creation module 138 supports a web page accessible through the web browser 218, and allowing a donor to make entries and selections to create a token and direct its transmittal.

FIG. 3A illustrates an initial display screen 300 presented to a user by the monitor 212 of the donor computer 114A. The display screen 300 presents an initial selection screen to a user, presenting an introductory message to the user and allowing the user to select from a number of initial choices. In the present example, the user has the choice of creating a prepaid debit card issued through a financial network, by activating one of the selector buttons 302 or 304, or by selecting one of a plurality of retailers, by selecting one of the selector buttons 306, 308, 310, and 312. The retailers of this example include the College Design home furnishing store, the Office Elements Superstore, the Colossal Discount Supermarket, and the Excellent Ambience Restaurant. The initial display screen 300 also presents a selector button 313 for indicating that the donor wishes to choose multiple retailers. Activation of the selector button 313 leads to one or more further displays presenting selections of groups of retailers that may be chosen.

Figure 3B:
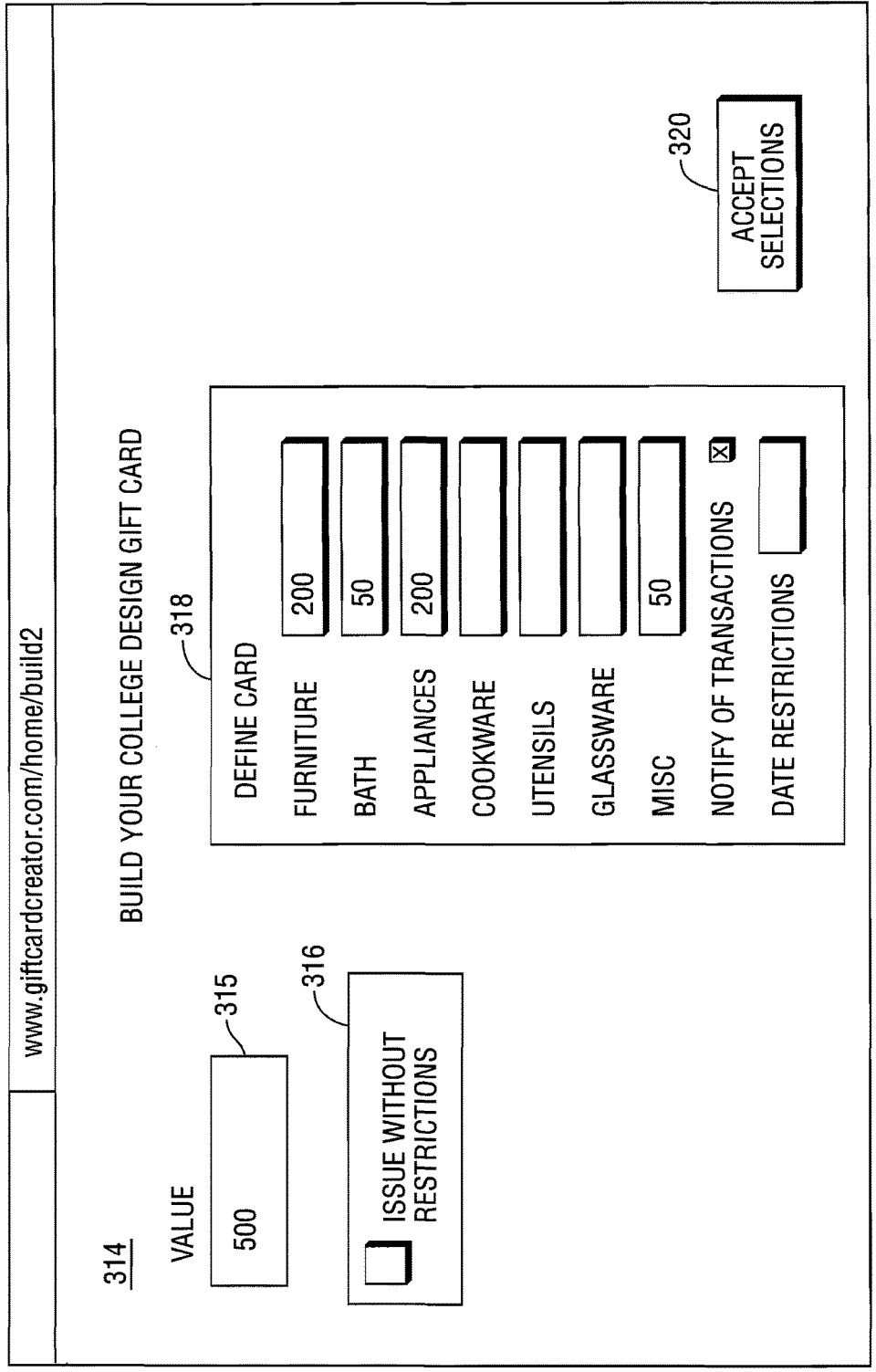

FIG. 3B illustrates a display 314, generated after the selector button 306 has been activated. The display 314 presents a gift card creation screen, providing a field 315 for entry of the card's value, a selection field 316 for issuing the card with or without restrictions. If the card were being issued without restrictions, the selection box would be filled in, but in the present example the selection box is blank because the card is being issued with restrictions.

The display 314 further presents a definition section 318, allowing the user to select categories for which expenditures are allowed and expenditure limits on categories. The server 102 communicates with the retailer server 122 to retrieve appropriate category information for presentation in the definition section, allowing the user to make selections based on the actual products carried by the retailer and the product categories as defined by the retailer. In the present example, the product categories are furniture, bath accessories, small appliances, cookware, cooking utensils and gadgets, tableware, glassware, and miscellaneous. The user has selected furniture, small appliances, and bath accessories, and entered limits of $200 for furniture, $200 for small appliances, and $50 for bath accessories. The amount not allocated to specific categories is available for miscellaneous purchases, so that the authorized limit for "miscellaneous" is $50. The definition section 318 also allows the donor to choose to receive notification of transactions or not, or to specify a valid date range. An "Accept Selections" button 320 can be activated to accept the selections and proceed to the next screen.

FIG. 3C illustrates a display screen 324, generated after selections have been made and the "Accept Selections" button has been activated. The details of a card are presented, including the value and authorized uses of the card. In addition, the display screen 324 provides for selections and entries allowing a user to specify a recipient and to specify delivery mechanisms. A recipient identification section 326 allows a user to specify identification details for a recipient, such as name, address, and identification document number, such as driver's license number or passport number, and to choose whether or not to allow modification suggestions. A delivery selection section 328 allows a user to specify delivery mechanisms, such as postal mail delivery, email delivery, or issuance at a kiosk such as the kiosk 114C, and a payment section 330 allows for entry of payment information. In the present example, the user has entered the name of the recipient, and specified that the recipient is to receive a physical card at any freestanding kiosk belonging to the system 100. The user is presented with an authentication code which can be given to the recipient. Upon a selection by the user to accept the card details, the token creation module stores an appropriate token record in the repository 126 of the server 102.

Figure 4:
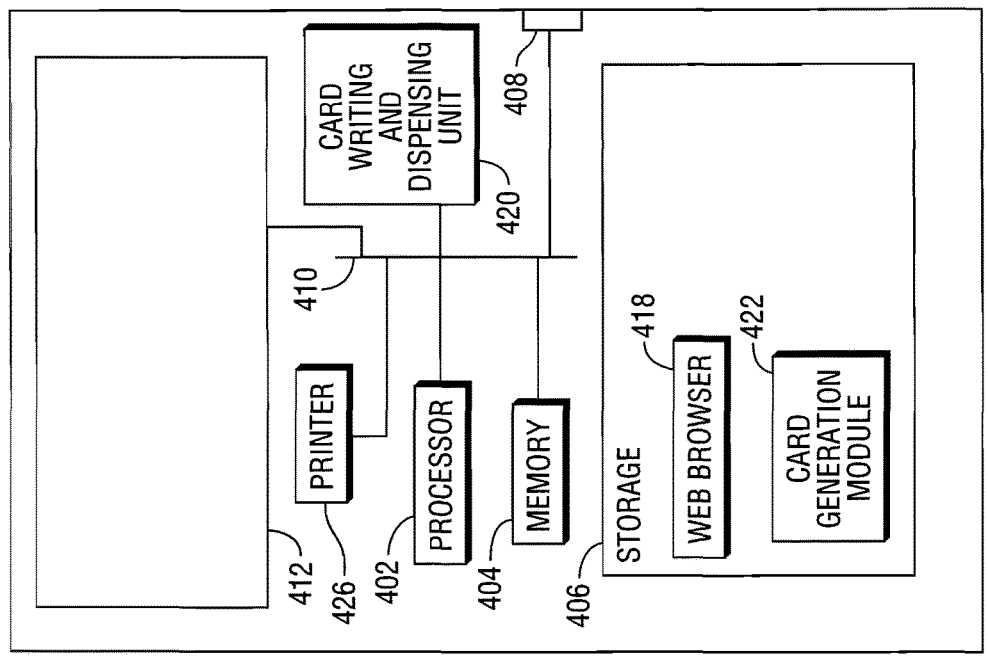
FIG. 4 illustrates details of a self service kiosk according to an aspect of the present invention.

FIG. 4 illustrates additional details of the kiosk 114C. The kiosk 114C may be used by a donor to create a token. The token record for the token may be centrally stored in the repository 126, and delivery to the recipient accomplished as desired. For example, a medium with recorded details may be delivered to the donor at the kiosk 114C, who may then deliver the token to the recipient. Alternatively, token details may be communicated electronically to the recipient, for example, at a recipient terminal such as the terminal 114B, or the recipient may be allowed to retrieve token details at a recipient terminal by furnishing sufficient identifying information. As a further alternative, the recipient may retrieve a physical medium, such as a gift card or a paper certificate, or may load an identifier or other details for a newly created token onto an existing medium at the kiosk 114C, or at another similar kiosk. Depending on directions of the donor, the recipient may retrieve the token at a specific terminal, at one of a specified group of terminals, such as at any kiosk that operates to deliver tokens, or at any desired device having the capability to deliver the required data.

The kiosk 114C comprises a processor 402, memory 404, storage 406, and network interface 408, communicating over a bus 410. The kiosk 114C further comprises a display 412, which may be a touch screen display. The kiosk 114C communicates with the server 102 over the public Internet 108, using a web browser 418, which is implemented as software residing in storage 406 and transferred to memory 404 as needed for execution by the processor 402. The token creation module 138 supports a web page accessible through the web browser 418, and allowing a donor to make entries and selections to create a token and direct its transmittal, and allowing a recipient to enter identification and receive a token. The kiosk 114C further comprises a card writing and dispensing unit 420, operating under the control of a card generation module 422. Creation of a token may be accomplished in a manner similar to that described above with respect to use of the terminal 114A. After a donor has created a token, the donor may elect to receive the token in the form of a card generated using the card writing and dispensing unit or may elect to receive the token in the form of a certificate generated using a printer 426, which may print a certificate having any features desired. For example, the certificate may include a bar code encoding an identifier associated with a stored token record, or may include a two dimensional bar code encoding an identifier as well as certificate details, such as a recipient name, token value, and other details. The donor may also elect to allow for electronic delivery to the recipient or pickup by the recipient at the kiosk 114C, another similar kiosk, or another terminal, with the pickup location being specified by the donor or left to the recipient, depending on donor choices.

The kiosk 114C may also be used to allow a recipient to pick up a medium representing a stored token. When a recipient approaches the kiosk 114C and indicates that he or she wishes to pick up a token, the card generation module 422 requests and receives a user identifier and retrieves a token record corresponding to the user identifier from the repository 126. The card generation module 422 then directs the issuance of a token, for example, directing the card writing and dispensing unit 420 to create and dispense a card corresponding to the token record, with the card being dispensed from the slot 424, or directing the printer 426 to print and dispense a paper certificate bearing appropriate details.

Figure 5A:
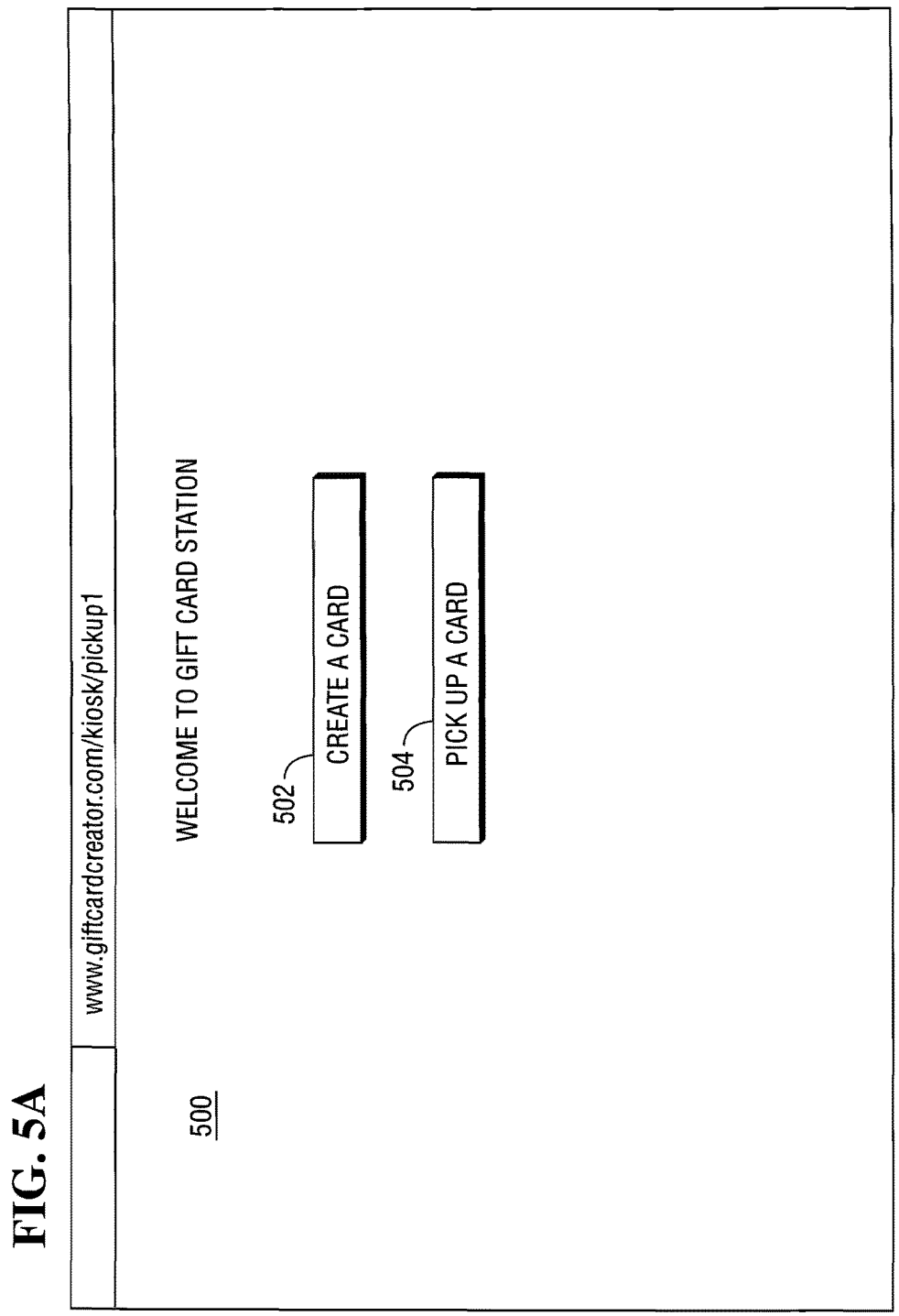
FIGS. 5A-5C illustrate display screens presented by a self service kiosk according to an aspect of the present invention.

FIG. 5A illustrates an exemplary display screen 500, presented by a terminal such as the kiosk 114C. The display screen 500 presents an initial display presenting a user with the choice of creating or receiving a gift card, with selection being accomplished by activating one of the selector buttons 502 and 504. In the present example, a user desires to receive a gift card that has been prepared and whose information has been stored, and has therefore activated the selector button 504.

Figure 5B:
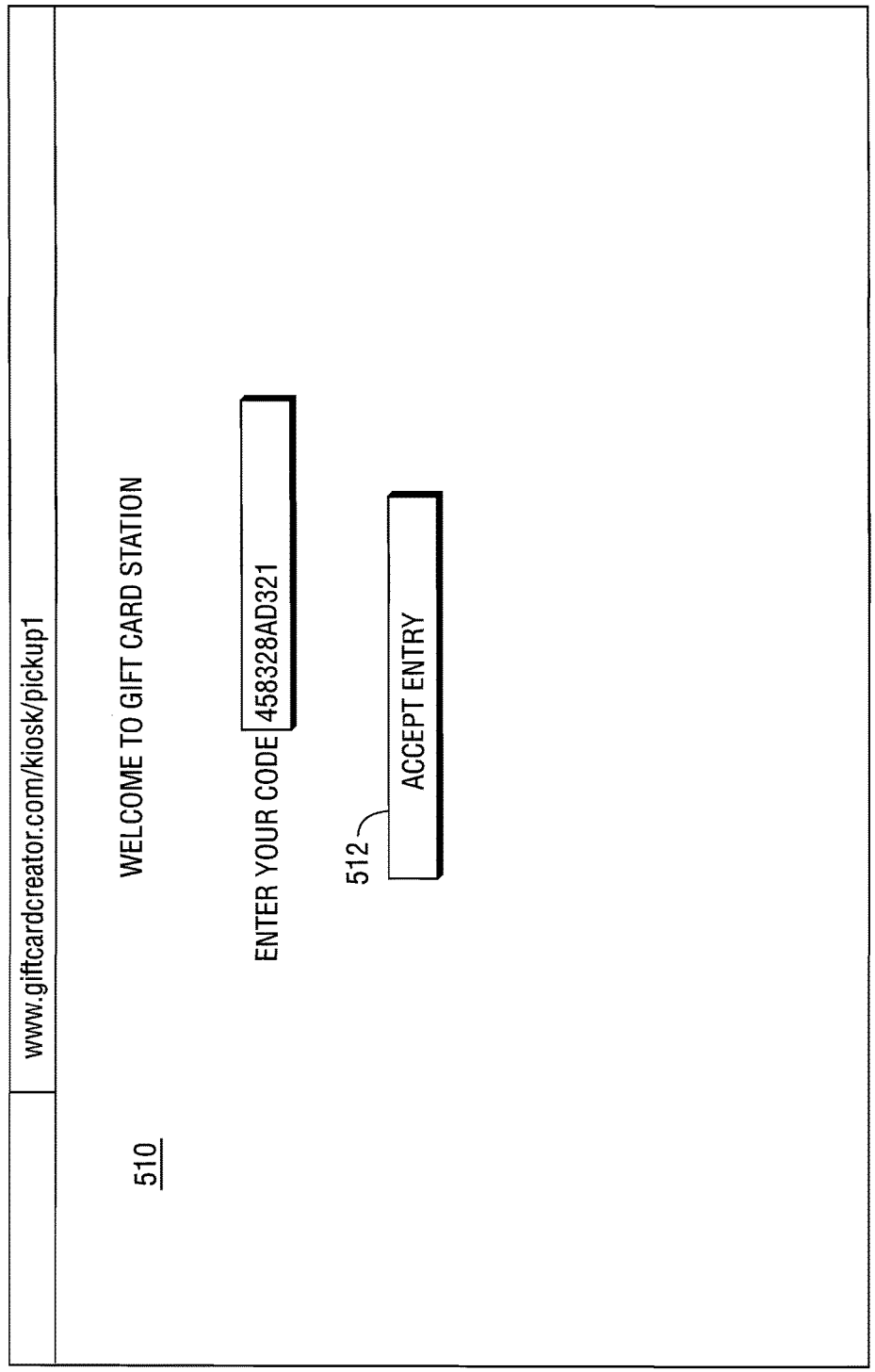

FIG. 5B illustrates an exemplary display screen 510, presented after the selector button 504 has been activated. The display screen 510 presents a message requesting entry of an identifier or presentation of an identification document, and includes a selector button 512 whose activation indicates that entry or presentation has been accomplished.

Figure 5C:
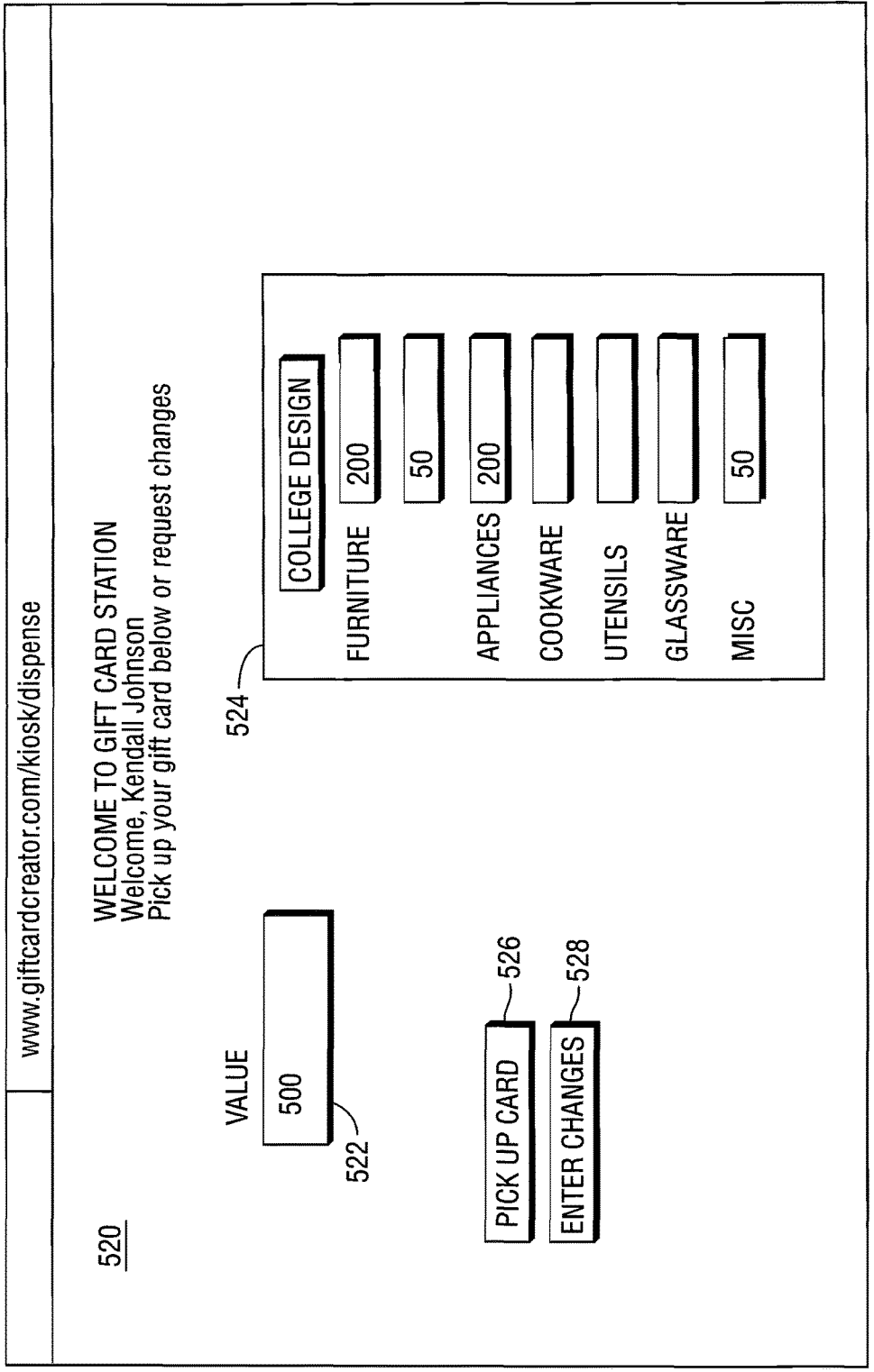

FIG. 5C illustrates an exemplary display screen 520, presented after the activation of the selector button 512. The display screen 520 presents a message that identification has been successful, and inviting the recipient to receive the gift card or to suggest modifications. The display screen presents a value entry area 522 showing the value of the token and allowing entry of a suggested value, as well as a specification area 524, showing the authorized categories and their values, and allowing entry of new values for the same or different categories. The selection buttons 526 and 528 allow the user to receive the token as originally defined from the card writing and dispensing unit 420, or to direct transmission of modification suggestions entered using the value entry area 522 and the specification area 524.

FIG. 6 illustrates additional details of the point of sale terminal 124. The point of sale terminal 124 includes a processor 602, memory 604, and storage 606, as well as a user interface 608, which may suitably be a touch screen display, a network interface 610, and a bus 612. The point of sale terminal 124 communicates with the retailer server 122, which provides access to the financial server 128. The point of sale terminal 124 implements a transaction and payment module 614, suitably implemented as software residing in storage 606 and transferred to memory 604 as needed for execution by the processor 602. The point of sale terminal 124 is operative to receive inputs identifying items to be purchased in a transaction and the transaction and payment module 614 updates a transaction record 616 as the items are presented. When a payment token is presented, the terminal 124 invokes a token redemption module 618. The token redemption module retrieves token information through the retailer server 122, which communicates with upstream servers as needed to retrieve information associated with the token, such as a token record. If the token includes restrictions, the token redemption module communicates the restrictions to the transaction and payment module 614, which examines the transaction record 616 and rejects items that are not authorized for purchase, or that exceed purchase limits for a category of items. If desired, a token may be presented at the beginning of a transaction, so that items not authorized for purchase using the token may be rejected as they are presented, rather than requiring the possible removal of items at the conclusion of a transaction.

If a token specifies items for purchase, such as items making up a meal at a restaurant, the token may be presented at the beginning of the transaction. The transaction and payment module 614 directs retrieval of a token record associated with the token, and updates the transaction record 616 with the items specified in the token record. An appropriate order record 620 may be delivered to employees for fulfillment, such as order assembly staff at a retailer, or kitchen staff at a restaurant.

Figure 7:
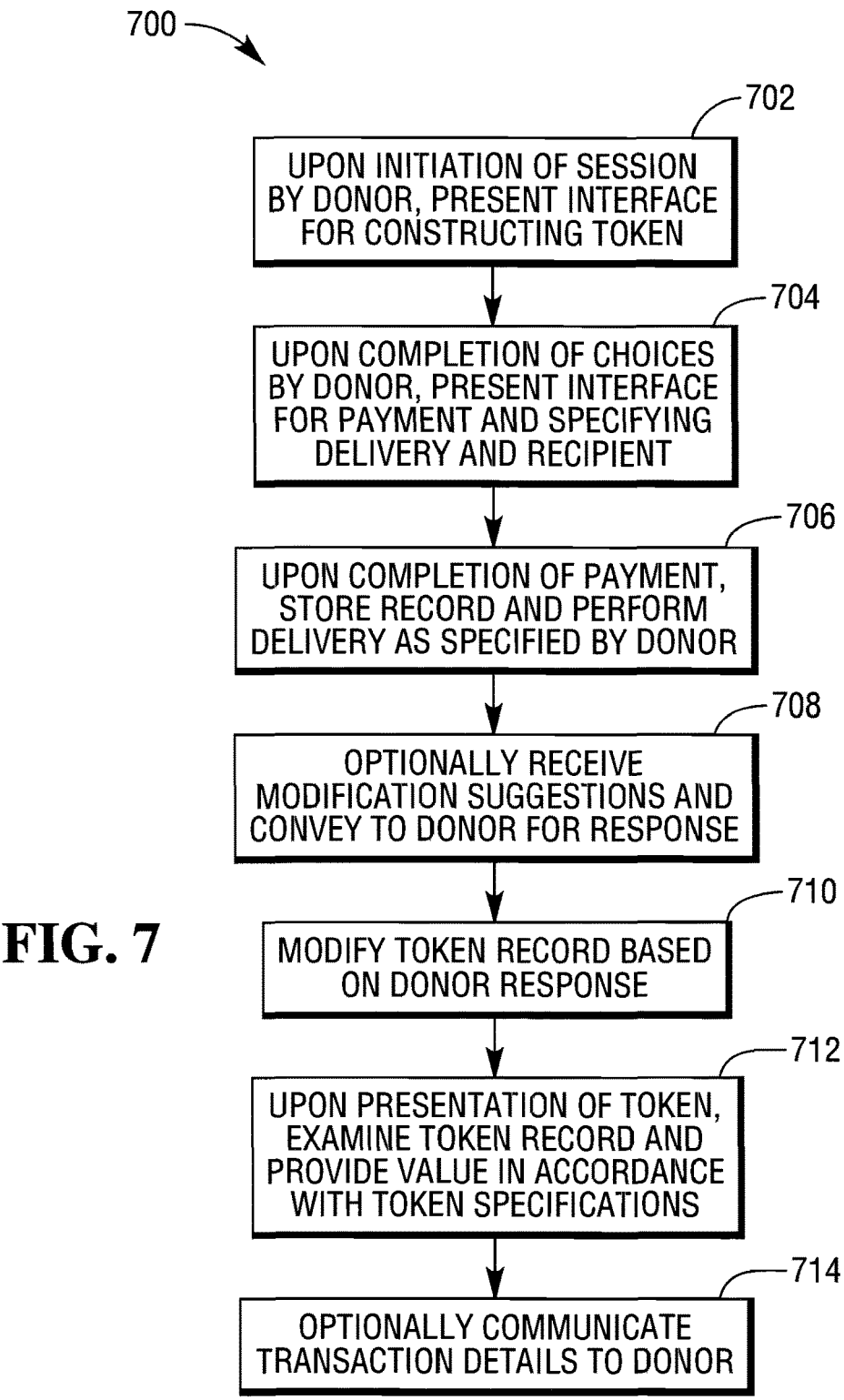
FIG. 7 illustrates the steps of a process according to an aspect of the present invention.

FIG. 7 illustrates the steps of a process 700 for creating, managing, and redeeming stored value tokens. The process 700 may suitably be carried out using a system such as the system 100 of FIG. 1. At step 702, upon initiation of a session by a donor, an interface is presented to the donor, allowing the donor to specify token attributes such as value, type of token, such as a general use token or a token redeemable at a particular merchant or group of merchants, and to add information restricting purchase that may be made or specifying items to be purchased. At step 704, upon completion of choices by a donor, a further interface is presented to the donor allowing the donor to specify a recipient and a delivery mechanism and to tender payment.

At step 706, upon completion of payment, a record of the token is stored and delivery is accomplished as specified by the donor. Delivery may be accomplished, for example, by creation of a physical token and delivery to a donor for personal delivery or mailing to a recipient, through electronic delivery of virtual certificate, or through continued storage of token information in a central repository allowing a recipient to present identification, such as an identification document or a code delivered by the donor, and receive a token corresponding to the stored information. At optional step 708, performed upon receipt of alternative suggestions from the recipient, the alternative suggestions are conveyed to the donor for response. At optional step 710, the token record is modified based on the response of the donor. At step 712, upon presentation of the token for redemption, stored information associated with the token is examined and value is given for the token in accordance with the token's specifications. For example, the token may be presented at the beginning of a transaction at a point of sale terminal, which will communicate with an appropriate device, such as a retailer server storing information relating to items offered by the retailer, as each item is presented for purchase. As each item is presented, the item identification will be examined to determine how its purchase should be treated in light of the limits imposed by the card, such as whether the purchase is prohibited, whether the item falls into a category whose purchase is allowed within specified monetary limits, or whether the item corresponds to specific items designated for purchase, for example. In one convenient embodiment, the recipient may present the card at the beginning of a transaction if desired, and the point of sale terminal will communicate with a repository storing token information, or read the information directly from the token, and present information identifying the items to be purchased so that they may be assembled and delivered. At optional step 714, transaction details are conveyed to the donor.

While the present invention is disclosed in the context of a presently preferred embodiment, it will be recognized that a wide variety of implementations may be employed by persons of ordinary skill in the art consistent with the above discussion and the claims which follow below.

I claim:

1. A method for managing a non-transitory computer-readable storage medium stored value token, the method implemented as software within a non-transitory computer-readable storage medium for execution by a Point-Of-Sale (POS) terminal and a Self-Service (SS) kiosk, the method comprising:

receiving inputs, through a token interface module processed on the POS terminal, as entered by a donor operating the POS terminal, wherein receiving further includes providing, by the POS terminal, the token interface module allowing donor selections specifying characteristics of a token to be used by a recipient for payment of a subsequent transaction of the recipient with each characteristic selected by the donor altering information and other selections available to the donor as presented to the donor through the token interface module, and wherein receiving further includes designating, by the POS terminal, a token type for the token as specifically defined by donor with one or more inputs through the token interface module, and wherein receiving the inputs further include receiving from the donor some of the inputs that specifically define each member of a donor-defined group of retailers where the token can be redeemed by the donor, and wherein receiving the inputs further include receiving user-specified delivery mechanisms available for delivering the token to the recipient;
controlling a processor, by the software executing on the POS terminal, and creating a token definition based on the inputs of the donor, the token definition including an amount of stored value associated with the token and restrictions on a type and value of items that are permitted to be purchased using the token, wherein the restrictions are associated with redemption of the token by the recipient for payment of the subsequent transaction of the recipient;
controlling the processor, by the software executing on the POS terminal, and storing the token definition in a memory;
controlling the processor, by the software, and creating a record with a server for the token, wherein the record maintains the token definition and is updated when the token is used for transactions, and including with the record identifying information for identifying the record;
controlling the processor, by the software, and delivering identifying information for the token to the donor at the POS terminal; writing an encoded identifier for the token on a magnetic stripe card or writing the encoded identifier to a smart card in accordance with the user-defined delivery mechanism;
receiving, at the SS kiosk, the identifying information;
obtaining, by the SS kiosk, the token definition from the record using the identifying information from the server;
writing, by the SS kiosk, the token definition with the identifying information on a magnetic stripe card;
dispensing, by the SS kiosk, the magnetic stripe card
reading, by the SS kiosk, the magnetic stripe card presented by the recipient for a payment of a recipient transaction;
presenting, by the SS kiosk, conditions for using the token for the payment;
asking, by the SS kiosk, whether the recipient wants to ask the donor for any changes in the conditions;
providing, by the SS kiosk, a particular change proposed by the recipient to server;
receiving, by the SS kiosk, an acceptance by the donor communicated through the server for the particular change; and
processing, by the SS kiosk the payment for the recipient transaction using the token and the particular change to the conditions.

2. The method of claim 1, wherein creation of a token definition includes specification of one or more prohibited categories of goods that are permitted to be purchased, with purchases being allowed for any goods outside the one or more prohibited categories.

3. The method of claim 1, wherein creation of a token definition includes specification of a plurality of categories of goods that are permitted to be purchased, with each category of goods being associated with a monetary limit for the category.

4. The method of claim 1, wherein creation of a token definition includes specification of each item to be purchased using the token.

5. The method of claim 1, further comprising the steps of controlling the processor to communicate with a redemption server processing a redemption transaction for a token, and controlling the processor to examine the token definition and deliver the token definition to the redemption server upon receiving a token definition from the redemption server.

6. The method of claim 5, further comprising a step of receiving transaction information from the redemption server and updating the token definition to reflect results of the redemption transaction.

7. The method of claim 6, further comprising a step of conveying transaction details to a donor.

* * * * *